United States Patent [19]

Kuraoka et al.

[11] Patent Number: 4,848,851
[45] Date of Patent: Jul. 18, 1989

[54] BRAKE CONTROL SYSTEM ON TURNING OF MOTOR VEHICLE

[75] Inventors: Hiroaki Kuraoka, Oobu; Naoto Ohoka, Toyohashi; Masahiro Ohba, Okazaki, all of Japan

[73] Assignee: Nippondenso Co., Ltd., Kariya, Japan

[21] Appl. No.: 936,107

[22] Filed: Nov. 28, 1986

[30] Foreign Application Priority Data

Nov. 28, 1985 [JP] Japan .................. 60-267734

[51] Int. Cl.⁴ .................. B60T 8/58; B60T 8/82; B60T 8/68
[52] U.S. Cl. .................. 303/100; 303/96; 303/109; 364/426.01; 364/426.02
[58] Field of Search .................. 188/181 A, 181 C; 303/100, 102, 103, 106, 107, 108, 109, 110, 111, DIG. 3, DIG. 4, 95, 96, 97; 364/426; 180/79.1, 142, 197

[56] References Cited

U.S. PATENT DOCUMENTS

| | | |
|---|---|---|
| 3,797,892 | 3/1974 | Leiber . |
| 3,910,647 | 10/1975 | Takeuchi .................. 303/100 |
| 3,918,058 | 11/1975 | Noyori et al. . |
| 4,043,608 | 8/1977 | Bourg et al. . |
| 4,321,676 | 3/1982 | Ohmori et al. .................. 303/109 |
| 4,475,159 | 10/1984 | Gerstenmaier et al. . |

FOREIGN PATENT DOCUMENTS

| | | |
|---|---|---|
| 0166700 | 1/1986 | European Pat. Off. . |
| 60-1061 | 1/1985 | Japan .................. 303/111 |
| 1297976 | 11/1972 | United Kingdom . |

*Primary Examiner*—Andres Kashnikow
*Assistant Examiner*—Timothy Newholm
*Attorney, Agent, or Firm*—Cushman, Darby & Cushman

[57] ABSTRACT

Disclosed a brake control system for stably performing the brake control of a motor vehicle. The brake control system is arranged so as to control a braking pressure applied to a vehicle wheel so that the wheel speed becomes equal to a target wheel speed. The target wheel speed is determined on the basis of a predetermined slip ratio of the wheel and the vehicle speed of the wheel portion. The vehicle speed of the wheel portion is derived as a function of the turning radius determined in the steering amount of the vehicle and the vehicle speed. The brake control system is preferably constructed as an integral-added optimal regulator which controls the braking pressure on the basis of an optimal feedback gain predetermined in accordance with a dynamic model of a system performing the brake of the vehicle.

7 Claims, 9 Drawing Sheets

BRAKE CONTROL SYSTEM ON TURNING OF MOTOR VEHICLE

BACKGROUND OF THE INVENTION

The present invention relates generally to a brake control system for use in a motor vehicle, more particularly to such a brake control system which optimally controls the braking pressure on turning of the motor vehicle.

Anti-skid control systems are known as systems for controlling the speed of each of the wheels of a motor vehicle to maximize the frictional force between a tire and a road surface by causing the slip ratio S [(vehicle speed-wheel rotational speed)/vehicle speed] to be controlled at approximately 20%. This prevents the vehicle from suffering a decrease in safety due to locking of the wheels when braking. An example of this is a loss of control of the vehicle due to the locking of the front wheels and hip-swinging (skid) due to the locking of the rear wheels. (One example of such a system is disclosed in Japanese Provisional Publication No. 57-11149.)

In anti-skid control systems of this type, in order to maximize the frictional force between the tire and road surface and allow the vehicle to stop quickly without causing locking of the wheels, the rotational speed of each of the wheels is compared with a reference speed V derived on the basis of a vehicle speed Vs, i.e., given by $V = Vs(1 - S/100)$ where S represents the slip ratio (about 20%) and the braking hydraulic pressure is up-and-down controlled so that the rotational speed of the wheel becomes equal to the reference speed. That is, when the rotational speed of the wheel is below the reference speed, the control system causes adjustments to decrease the braking pressure applied to the wheel. When rotation speed exceeds the reference speed the control system causes an increase in the braking pressure. This braking pressure control is repeatedly performed so that the rotational speed of the wheel becomes closer to the reference speed.

Furthermore, it is known that the braking pressure can be controlled on the basis of the inclination degree of the vehicle body without the generation of excessive braking force (Japanese Provisional Publication No. 49-8690).

Such prior art systems suffer no problem as long as the motor vehicle runs straightforward. However, when the motor vehicle is turning, appropriate control for each of the wheels is not performed since slip conditions of the left and right wheels are determined in accordance with a level relating to vehicle speed and inclination degree of the vehicle body. Therefore, when braking is performed during turning of the vehicle, the prior art systems have a disadvantage in that the brake control start timings for the left and right wheels are different from each other. This results in different steering sensitivity when turning than is a normal driving condition.

SUMMARY OF THE INVENTION

The present invention has been developed in order to eliminate the above-mentioned disadvantage inherent in the prior art braking control systems.

It is therefore an object of the present invention to provide a new and improved brake control system for vehicles which is capable of stably performing brake control when turning a vehicle as well as when driving the vehicle in a straight line.

According to a feature of the present invention, a target wheel speed of a wheel of a motor vehicle is determined on the basis of a vehicle speed and a turning radius determined in accordance with a steering amount of the vehicle. The wheel speed is controlled so as to become equal to the determined target wheel speed.

In accordance with the present invention, there is provided a system for controlling the brake of a vehicle comprising: first detector means for detecting a steering amount of the vehicle; second detector means for detecting a wheel speed of a wheel of the vehicle; third detector means for detecting a vehicle speed of the vehicle; braking pressure adjusting means for adjusting the braking pressure transferred through a pressure transferring system to a braking member for braking the wheel; means for obtaining a turning radius of the wheel on the basis of the steering amount detected by the first detector means; means for obtaining a vehicle speed of the wheel portion on the basis of the obtained turning radius and the detected vehicle speed; means for setting a target wheel speed of the wheel on the basis of the obtained wheel portion vehicle speed and a predetermined slip ratio of the wheel; and control means for controlling the braking pressure adjusting means so that the wheel speed detected by the second detector means becomes equal to the set target wheel speed.

In accordance with the present invention, there is also provided a system for controlling the brake of a vehicle, comprising: steering amount detecting means for detecting a steering amount of the vehicle; first detector means for detecting a first wheel speed of a first wheel of the vehicle; second detector means for detecting a second wheel speed of a second wheel of the vehicle; third detector means for detecting a vehicle speed of the vehicle; braking pressure adjusting means for adjusting braking pressures transferred through a pressure transferring system to braking members for braking said first and second wheels; means for obtaining turning radii of the first and second wheels on the basis of the steering amount detected by the steering amount detecting means; means for setting first and second target wheel speeds of the first and second wheels on the basis of the difference between the obtained turning radii and the detected vehicle speed; and control means for controlling said braking pressure adjusting means so that the wheel speeds detected by the first and second detector means become equal to the first and second target wheel speeds, respectively.

Preferably, the control means has state variable determining means for determining state variables representing the internal state of a system performing the braking of the wheels including a variable corresponding to a dead time on control of said pressure transferring system. Also, it is preferable that the control means is constructed as an integral-added optimal regulator for performing feedback control by determining a controlled variable for the braking pressure adjusting means on the basis of an optimal feedback gain which is predetermined in accordance with a dynamic model of the system performing the brake of the wheel.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
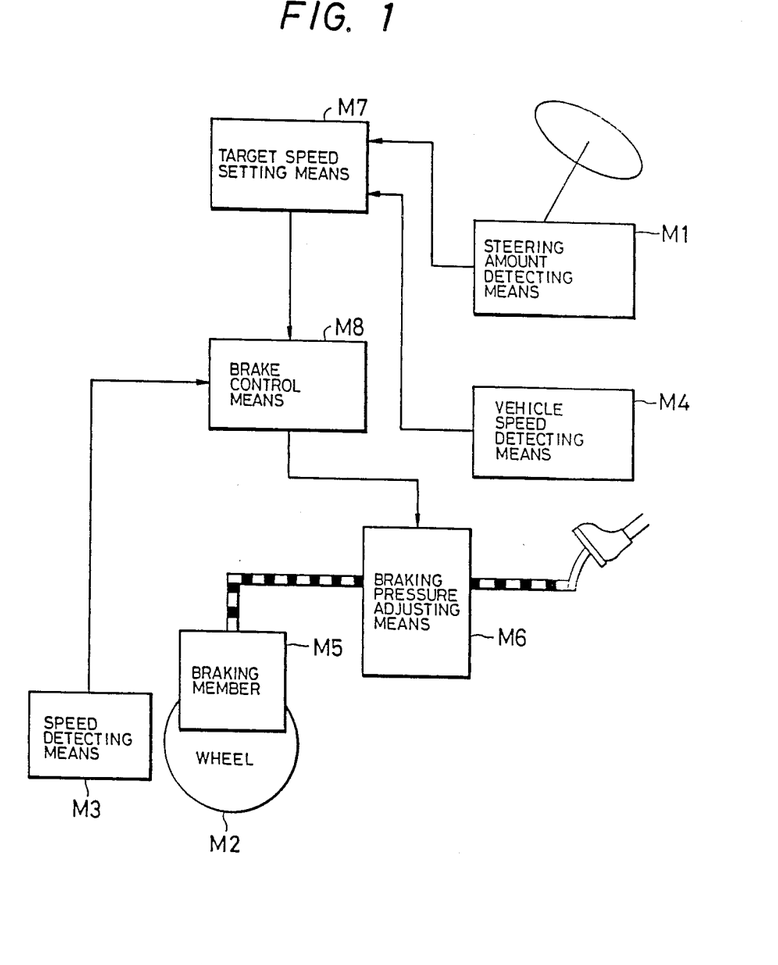
FIG. 1 is a schematic block diagram illustrating a brake control system according to an embodiment of the present invention and incorporated in a motor vehicle.

Referring now to FIG. 1, there is schematically illustrated a brake control system according to an embodiment of the present invention, FIG. 1 being useful for understanding the basic structure of the present invention.

As shown in the figure, the brake control system of a motor vehicle includes: steering amount detecting means M1 for detecting a steering amount of the motor vehicle; wheel speed detecting means M3 for detecting the wheel speed of a wheel M2, vehicle speed detecting means M4 for detecting the speed of the vehicle; braking pressure adjusting means M6 for adjusting a braking pressure of a pressure transferring system arranged to transfer a braking pressure caused by operation of a vehicle driver to a braking member M5 of the wheel M2; target wheel speed setting means M7 for obtaining the turning radius of the wheel M2 on the basis of the steering amount detected by the steering amount detecting means M1, obtaining the vehicle speed of the wheel M2 portion on the basis of the obtained turning radius and the vehicle speed detected by the vehicle speed detecting means M4, and setting a target wheel speed of the wheel M2 on the basis of the obtained wheel M2 portion speed and a predetermined slip ratio; and brake control means M8 for controlling the braking pressure adjusting means M6 so that the wheel speed of the wheel M2 detected by the wheel speed detecting means M3 becomes equal to the target wheel speed set by the target rotational speed setting means M7.

The steering amount detecting means M1 detects the rotating angle or rotated position of the steering shaft, an angle between the wheel steered and the vehicle body, or the like. For example, it is arranged such that it is magnetically or optically detected by means of a device provided in association with the steering shaft, one example will be described in detail hereinafter.

The wheel speed detecting means M3 is arranged to detect the rotational speed or rotational angular velocity of the wheel M2, for example, by a device similar to the device employed for the steering amount detecting means M1. The wheel speed may be rotational speed or rotational angular velocity on ground surface. However, when compared with the vehicle speed, the rotational angular velocity is converted into the rotational speed on the ground surface.

The vehicle speed detecting means M4 is arranged to detect the vehicle speed by using a sensor sensing the speed of the vehicle with respect to the ground with the utilization of Doppler effect or by sequentially integrating the acceleration of the vehicle (deceleration at the time of braking operation) obtained by an acceleration sensor on the basis of a speed obtained from the speed of rotation of the non-driven wheel immediately before braking operation.

As the braking member M5 of the wheel M2 is well known as a brake shoe in a drum type braking device or disc and friction pat in a disc type braking device. The brake shoe or the like is driven by a wheel cylinder or the like provided for each of the wheels M2. The wheel cylinder or the like is driven in accordance with the operation by a vehicle driver, for example, the transfer of the braking hydraulic pressure generated in accordance with the stepping of a brake pedal. The pressure transferring system to transfer the braking pressure is arranged to transfer the force by means of gas such as air or liquid such as oil. It is also appropriate to arrange so-called power brake using a magnification device.

The braking pressure adjusting means M6 acts to adjust the pressure in the pressure transferring system to be pressure-increased, pressure-decreased or pressure-maintained. The braking pressure adjusting means M6 may be arranged to, for example, have a predetermined volume effectively respective to the pressure transferring system. The volume will then expand at the time of pressure-decreasing so that the force transferred to the braking member M5 is decreased. The control is then performed in reverse to this at the time of pressure-increasing. The braking pressure adjusting means M6 may also be arranged to have a pump, reservoir and directional control valve and directly perform the control for increasing, decreasing and maintaining the pressure in the pressure transferring system.

The target rotational speed setting means M7 which control the wheels M2, sets as a target rotational speed a rotational speed of the wheel M2 at which a predetermined slip ratio can be obtained under the conditions of the present vehicle speed and steering amount. That is, when the vehicle turns, the advancing speeds of the left and right wheels are different from each other, and the speed of the outside wheel is higher than that of the inside wheel with respect to the center of turning. The turning radius of the outside wheel is greater than that of the inside wheel. Since the difference between the speeds depends upon the steering amount, the target wheel speed is determined taking into account the steering amount.

The slip ratio SL is obtained in accordance with the following equation.

$$SL = (1 - \omega/V) \times 100$$

where V is the speed of a vehicle and $\omega$ is the speed of the periphery of a wheel (corresponding to the rotational speed, or rotational angular velocity).

Figure 2:
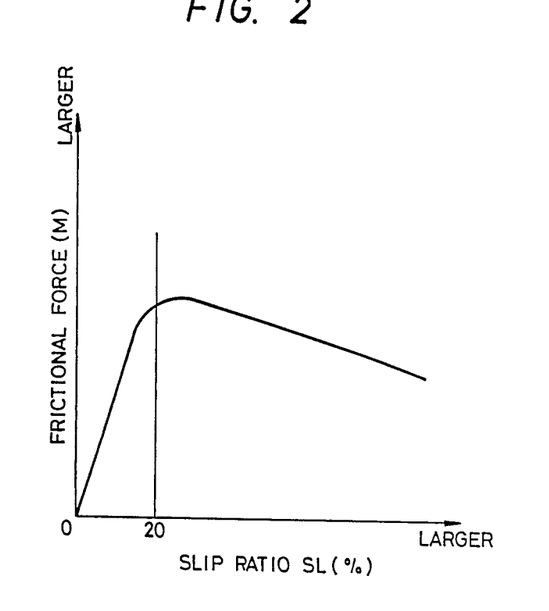
FIG. 2 is a graphic diagram showing the relation between the frictional force and the slip ratio.

The predetermined slip ratio is generally set to a value that maximizes the braking force, while it is also appropriate to varying the value in accordance with the operation of the vehicle. For example, the target slip ratio is varied in accordance with the stepping condition of the brake pedal. The relationship between the slip ratio SL and the frictional force M is shown in FIG. 2. As illustrated, the friction force M becomes maximum when the slip ratio SL is about 20%, and therefore the wheel M2 results in developing the maximum braking force. Therefore, if the determination is made wherein that the vehicle driver requires a great braking force when the stepping amount of the brake pedal is great, the slip ratio will be set to about 20% so that the vehicle is stopped in a minimum stopping distance. On the other hand, when the stepping amount of the brake pedal is small, if the determination is made that the driver requires a gentle decrease of the vehicle speed, then the slip ratio will be set to a small value, 5% for example. Therefore, the target rotational speed is varied in accordance with the slip ratio SL.

The brake control means M8 is arranged to control the braking pressure adjusting means M6 so that the wheel speed of the wheel M2 becomes equal to the target wheel speed. It is appropriate that the braking control means M8 is provided with state variable detecting means and is constructed as an integral-added optimal regulator which determines a feedback amount in accordance with the optimal feedback gain.

The state variable detecting means, being provided in the brake control M8, determines state variables representing the internal state of the system for the braking of the wheel M2 by means of estimation and/or detection. The state variables include at least a variable corresponding to the dead time on control of the pressure transferring system by which the adjustment of the braking pressure is made. The state variables necessary for the control of the rotational speed of the wheel M2, such as the pressure in the pressure transferring system and the braking force applied to the wheel M2 are estimated or detected. Of the state variables that exist, some variables cannot be directly detected. For example, the dead time in the system is determined by estimation in the case where it is estimated using an observer or the like, the accuracy necessary for the control can be ensured. The construction of the observer will be hereinafter described.

The brake control means M8 is generally realized using a microcomputer having a microprocessor and its associated units such as a ROM, a RAM, and an input-/output circuit. In addition to utilization of the control circuit employed for conventional anti-skid control, the brake control means M8 according to the present invention can also be arranged to determine the braking pressure transferred to the braking member M5. This determination is made on the basis of an optimal feedback gain F, which is predetermined in accordance with a dynamic model of a system relating to the braking of the vehicle and which determines a feedback amount sent to the braking pressure adjusting means M6. A control signal indicative of the determined feedback amount is then generated. That is, the brake control means M8 is constructed as an integral-added optimal regulator which determines an optimal feedback gain on the basis of the detected state variables and the predetermined slip ratio.

A method of constructing such as integral-added optimal regulator is described in detail in documents, such as "Linear System Control Theory" written by Katsuhisa FURUTA published by Shokodo Japan in 1976. A description of the method for actually forming such a regulator will be given hereinbelow. In the following description, the references F, X, A, B, C, y, u, L, G, Q, R, T, P indicate vectors (matrix). A superscript $T$ such as $A^T$ indicates transposed matrix. A superscript $-1$ indicates an, such as $A^{-1}$ inverse matrix. A symbol $\wedge$ such as $\hat{X}$ indicate, an estimate. A symbol $\sim$, such as $\tilde{C}$, indicates an amount handled by another system, i.e. a state observer (which will be simply referred to as observer hereinafter) such that the amount is generated by way of transformation or the like from the system relating to a controlled object. A symbol *, such as y*, indicates a target value.

It is known in modern control theory that in the control of a controlled object, i.e. the vehicle brake control in this case, the dynamic behavior of the controlled object can be described in a discrete-time system as:

$$X(k) = AX(k-1) + Bu(k-1) \quad (1)$$

$$y(k) = CX(k) \quad (2)$$

The term X(k) indicates state variables which represent the internal state of the system relating to the braking of a vehicle. The term u (k) indicates control input variables for the controlled object, i.e., pressure, for example, hydraulic pressure u. The term y (k) indicates control output variables of the controlled object, i.e., wheel speed ω. An amount DLY corresponds to the dead time of the control system, actual hydraulic pressure P and so on. The Eqs. (1) and (2) are both described in a discrete-time system, and a subscript "k" indicates that the value is of the present time. A subscript "k−1" indicates that the value is of the sampling time immediately preceding the present time.

The state variables X (k), indicating the internal state of the vehicle break system, represents information relating to the history of the system which is necessary and sufficient for predicting future operation of the control system.

The dynamic model of the system braking the wheel M2 will be clear if we can determine vector quantities A, B and C of Eqs. (1) and (2). Then it will be possible to optimally control the operation of the vehicle brake using the state variables X (k). For the actual control of a vehicle brake system the above described system has to be expanded, this expanded system is described hereinafter.

It is difficult to obtain dynamic models of a complex objective such as brake control of a vehicle because the model is not linear for the overall control range. However, when the vehicle is brake-controlled in a predetermined condition such as a given vehicle speed, since it can be considered that linear approximation is satisfied in the vicinity of the state, it is possible to construct a model in accordance with the state equation (1) and equation (2). Therefore, is possible to perform the linear approximation by dividing it into a plurality of normal conditions and each dynamic model can be determined.

The dynamic model of the system relating to the brake can be constructed in accordance with kinematic theory using a mechanical model of a hydraulic pressure system, while it is also possible to construct by system identification. Furthermore, the transient response method will be employed for the construction of an approximation model for the dead time of the control system and the like.

Once a dynamic model is determined, an amount of feedback is determined from the state variables X (k), the rotational angular speed ω(k) of the respective wheels M2 and its target rotational angular speed ω*(k), so that controlled amount u (k) of the braking pressure adjusting means M6, for controlling the braking pressure to each of the wheels M2, are theoretically and optimally determined. Normally, in a control system for the braking of a vehicle, variables directly influencing the braking operation of the vehicle, such as loads applied to the respective wheels M2, acceleration, transferring speed of oil or gas delivered to the braking member M5, the dynamic behaviour of the braking member M5, and the dead time of the pressure transferring system, may be treated as the state variables X (k). However, most of such variables are difficult to be directly measured. Therefore, in this case, means called state observer (observer) are formed within the brake control means M8 so that it is possible to estimate the state variables X (k) of the vehicle required. This is the observer according to modern control theory, and various types of observer and their designing methods are known. These are described in detail, for instance, in "Mechanical System Control" written by Katsuhisa Furuta, published from Ohm Co. Ltd. in 1984, and the observer may be designed as a minimum order observer or a finite time settling observer in correspondence with the fashion of an applied controlled object, i.e. the vehicle and the brake control system.

The brake control means M8 may be arranged to control the braking pressure adjusting means M6 in a system expanded using an accumulated value obtained by accumulating the difference between the target rotational speed of each of the wheels M2 and the actual rotational speed detected by the rotational speed detecting means M3, by determining an optimal feedback amount using both the measured or estimated state variables X (k) and further a predetermined optimal feedback gain. The second order accumulated value is a value which is necessary since the target rotational speed decreases as ramp function in accordance with the vehicle speed. Generally, in control of a servo system, it is required to perform control for cancelling the steady-state error between the target value and an actual controlled variable, and this corresponds to the necessity of inclusion of $1/S^l$ (integration of $l^{th}$ order) in a transfer function. In the case of the control system such as digital control in which the control amount is always determined with a finite accuracy, it is preferable to include such integrated amount in view of stability against noise. Therefore, when the accumulated value is introduced into the above-mentioned state variable X (k) to expand the system so as to determine the feedback amount from these values and a predetermined optimal feedback gain F, the controlled variable to the controlled object, i.e. the braking pressures to the respective wheels M2, are determined as an integral-added optimal regulator.

It will now be described with respect to the optimal feedback gain. In an optimal regulator to which an integral element is added, as described in the above, the way of finding a control input (the variables for control of the braking pressure of each the braking member M5 in this case) which minimizes a performance function J is clear. It is also known that the optimal feedback gain can be obtained from a solution of the Riccati equation, A, B, C matrixes of the state equation (1) and the output equation (2), and the weighted parameter used in the performance index (see the above-mentioned book). In the above, the weighted parameter (Q, R) is initially arbitrarily given so as to change the weighting in the regulation of the behavior of the braking hydraulic pressure of the system performing brake control of the vehicle by the performance index J. It is possible to determine an optimal value through repetition of simulation by changing the weighted parameter by a given amount from the behavior of the braking hydraulic pressure which are obtained as the result of simulation performed by a large computer with an arbitrary weighted parameter being given. As a result, an optimal feedback gain F is also determined.

Therefore, the brake control means M8 of the brake control system according to the present invention, in addition to being formed according to the classic control, is formed as an integral-added optimal regulator using a dynamic model of the system relating to the brake of the vehicle. This dynamic model is determined in advance through system identification, and the parameter of the observer therein and an optimal feedback gain F and so on are determined in advance through simulation.

While it has been described that the state variable X (k) is an amount indicating the internal state of the vehicle, this is not required to be a variable corresponding to actual physical amount, and therefore, this may be designed as a vector quantity of an appropriate order which is suitable for indicating the state of the vehicle.

The above-mentioned target rotational speed setting means M7 and brake control means M8 can be generally realized using a microcomputer comprising a microprocessor its associated units such as ROM and RAM, and input/output circuit.

Accordingly, in the present invention, the target wheel speed setting means M7, for the purpose of control of the slip ratio, sets a target wheel speed of the wheel M2 on the basis of the steering amount detected by the steering amount detecting means M1 in addition to the vehicle speed detected by the vehicle speed detecting means M4. That is, the target wheel speed is increased in accordance with an increase in the vehicle speed and the target wheel speed of the outside wheel M2 on turning of the vehicle is set to a higher value as compared with that of the inside wheel M2, taking into account the difference in turning radiuses of the right and left wheels depending upon the steering amount. The brake control means M8 performs the brake control so that the actual rotational speed detected by the wheel speed detecting means becomes equal to the target wheel speed thus obtained, the control being achieved by the brake of the wheel M2 in accordance with the actuation of the braking member M5 caused by the braking pressure adjusting means M6.

The embodiment of the present invention will be hereinbelow described in detail with reference to the drawings. Of the drawings, FIG. 3 is a schematic diagram illustrating the whole of a brake control system according to this invention incorporated in a motor vehicle with four wheels, and FIG. 4 is a control system diagram showing a control system with an electronic control unit.

Figure 3:
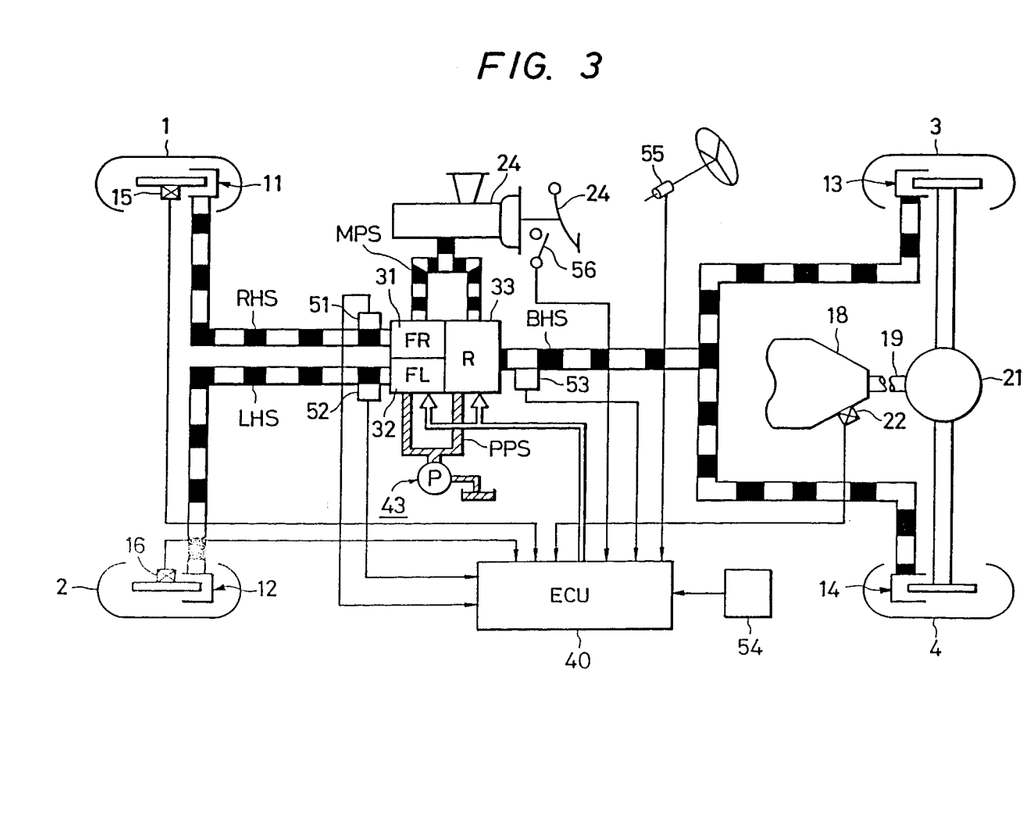
FIGS. 3 and 4 are diagrams showing the brake control system according to the embodiment incorporated with a brake system of a motor vehicle.
Figure 4:
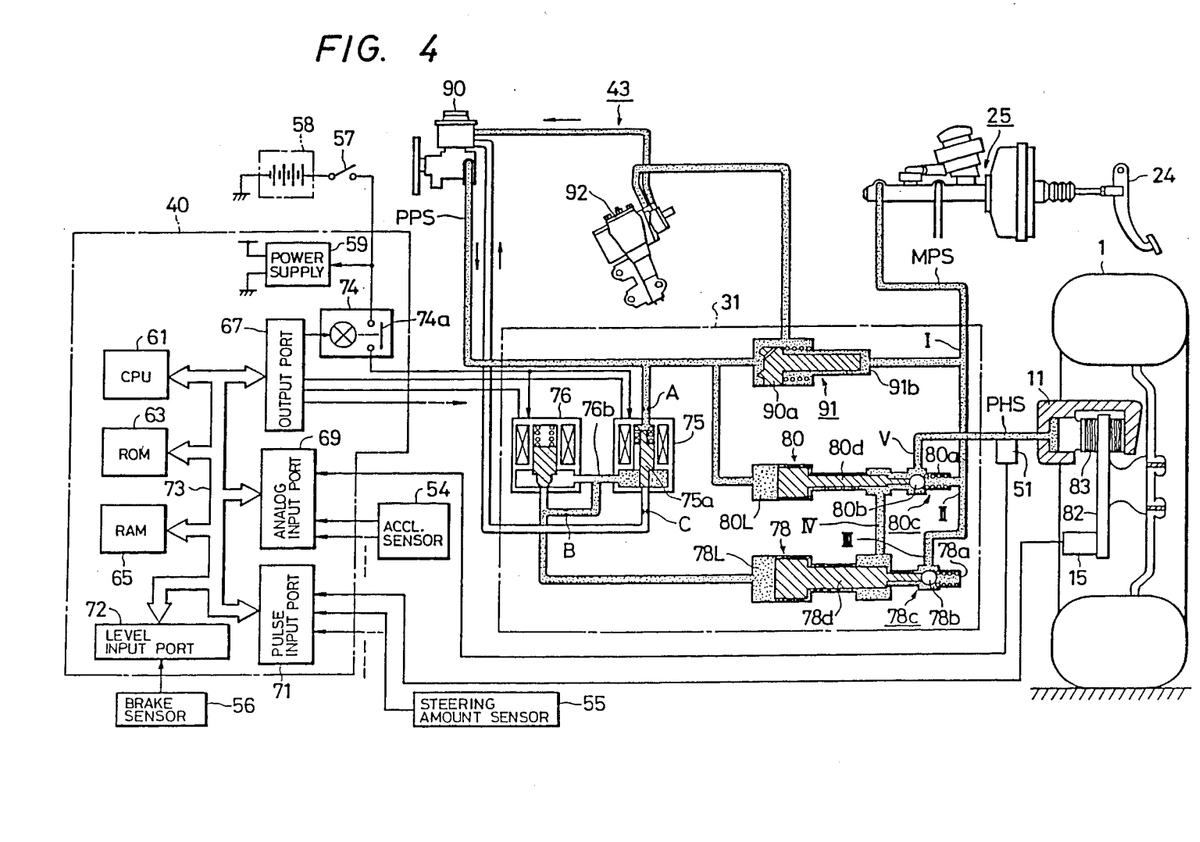

As shown in FIG. 3, hydraulic braking devices 11, 12, 13, 14 are provided for braking wheels 1, 2, 3, 4 of the vehicle with hydraulic pressure. The front wheels 1, 2 are respectively equipped with electromagnetic pickup type rotational speed sensors 15 and 16 for sensing the speed in terms of rotation of the wheel. The rotational speeds of the rear wheels 3 and 4 are detected by a rotational speed sensor 22 provided on a transmission 18, the rotation of rear wheels 3, 4 being made through a differential gear 21 in accordance with the rotation of the main shaft of the transmission 18.

The hydraulic braking devices 11 through 14 provided for the respective wheels act for the braking of rotation of the wheels 1 to 4 using the high hydraulic pressure generated by a master cylinder 25, such as tandem type cylinder, which is operatively coupled to a brake pedal 24 of the vehicle. The braking hydraulic pressure delivered from the master cylinder 25 through a hydraulic pressure system MPS is regulated by actuators 31, 32 and 33. The actuators 31, 32 and 33 control independently the braking hydraulic pressures applied to the front-right wheel 1, the front-left wheel 2, and the rear wheels 3 and 4 under control of an electronic control unit (ECU) 40. The actuators 31 through 33, the arrangement of which will be hereinafter described in detail, respectively act as the braking pressure adjusting means M6 for adjusting the braking hydraulic pressure for each of the wheels 1 though 4 using the hydraulic pressure delivered from a hydraulic pressure generating device 43 for power steering through the hydraulic pressure system (power steering hydraulic pressure system PPS). The hydraulic pressure of a hydraulic pressure system RHS applied to the front-right wheel 1 for brake is detected by a hydraulic pressure sensor 51, and the hydraulic pressure of a hydraulic pressure system LHS applied to the front-left wheel 2 is detected by a hydraulic pressure sensor 52. Furthermore, the hydraulic pressure of a hydraulic pressure system BHS applied to the rear wheels 3 and 4 is detected by a hydraulic pressure sensor 53.

The ECU 40 is responsive to signals indicative of the hydraulic pressure values from these hydraulic pressure sensors 51, 52, 53, signals indicative of wheel speeds from the rotational speed sensors 15, 16, 17, a signal from a brake sensor 55 for detecting the operating amount of the brake pedal 24, a signal from an acceleration sensor 54 for detecting the acceleration (or deceleration) of the vehicle and a signal from a steering amount sensor 55 for detecting the rotation amount of the steering, and controls the actuators 31, 32, 33 for controlling the rotational speeds of the respective wheels 1 through 4.

The control of braking force is performed independently for the front-right wheel 1, front-left wheel 2 and the rear wheels 3 and 4, and therefore, the description of the control will be herebelow described about only the front-right wheel 1 with reference to FIG. 4, which is a diagram illustrating, particularly, the system controlling the brake for the front-right wheel 1.

As illustrated in FIG. 4, the ECU 40 has a power circuit 59 coupled through an ignition key 57 to a battery 58 for supplying a constant voltage to the whole unit, and includes a CPU 61 and its associated units such as a ROM 63, a RAM 65, an output port 67, an analog input port 69, a pulse input port 71 and a level input port 72, which are connected through a common bus 73 therebetween. The ECU 40 is constructed as an arithmetic and logic circuit, and is arranged to control the braking hydraulic pressure delivered from the master cylinder 25 through a pressure-decreasing cylinder 78 and a bypass cylinder 80 to the braking device 11 by operating a main relay 74, and a main solenoid-operated valve 75 and a secondary solenoid-operated valve 76 in the actuator 31. In response to the increase of the braking hydraulic pressure the braking device 11 acts to stop the rotation of the wheel 1 by pressing a friction pad 83 against a disc 82 which is rotated together with the wheel 1. That is, the ECU 40 corresponds to the brake control means M8 and the target rotational speed setting means M7.

To the actuator 31 is delivered the power steering hydraulic pressure from a power steering hydraulic pressure generating device 43 comprising a power steering hydraulic pressure pump 90 and a reservoir (not shown). During the condition in which the control of the hydraulic pressure is not performed particularly, in power steering hydraulic pressure system PPS, oil is circulated from the hydraulic pressure pump 90 through a regulator 91 of the actuator 31 and a power steering gear box 92. A regulator piston 91a of the regulator 91 receives the braking pressure at end surface 91b thereof and, in response to the increase of the braking hydraulic pressure, acts to make small the cross-sectional area of the passage of the power steering hydraulic pressure system PPS so that the hydraulic pressure of power steering hydraulic pressure system (which will be referred to as steering hydraulic pressure) is increased in accordance with the braking hydraulic pressure.

The main portion of the pressure-decreasing cylinder 78 comprise a cutoff valve 78c having a spring 78a and a ball 78b and a pressure-decreasing piston 78d. The pressure-decreasing piston 78d is operated in accordance with the balance between the force provided by the braking hydraulic pressure and the force provided by the steering hydraulic pressure, and is normally pushed into the position shown in FIG. 4 to set the cutoff valve 78c to the opening condition because a receiving portion defined at an end of the pressure-decreasing piston 78d receives the steering hydraulic pressure as it is when the main solenoid-operated valve 75 and the secondary solenoid-operated valve 76 are respectively set to the off-condition.

Similarly, the bypass cylinder 80, the main portion of which comprises a directional control valve 80c having a spring 80a and a ball 80b, and a bypass piston 80d, is normally set to the postion shown in FIG. 4. Therefore, in this condition, when the braking pressure is increased by the master cylinder 25 in response to the brake pedal 24 being operated, the braking hydraulic pressure is fed through the passages I-II-III-IV-V of the braking hydraulic pressure system MPS shown in FIG. 4 to the braking device 11.

On the other hand, when the ECU 40 is in the normal operating condition and the control of the slip ratio is performed in the condition that the main relay 74 is driven through the output port 67 so that a contact 74a thereof is closed, the braking hydraulic pressure is controlled as follows.

(1) When determination is made that the wheel 1 is excessively braked to cause slippage due to high braking hydraulic pressure (for example, $SL > 0.2$), the ECU 40 controls the actuator 31 so that the main solenoid-operated valve 75 is set to an on-condition. In this case, since a valve 75a of the main solenoid-operated valve 75 is lifted upward in FIG. 4, the steering hydraulic pressure being supplied to the pressure-decreasing cylinder 78 is cut off. As a result, oil within a left-chamber 78L of the pressure-decreasing cylinder 78 is slowly discharged through orifices B and C to the reservoir (not shown) of the steering hydraulic pressure system PPS. Therefore, the pressure-decreasing piston 78d is moved so that the cutoff valve 78c is closed. The braking pressure is slowly decreased because the volume of the braking pressure system PHS is gradually increased in accordance with the movement thereof.

(2) In the similar condition, when the secondary solenoid-operated valve 76 is set to on-condition, a bypass passage 76b is defined which bypasses the orifice B and oil within the left-chamber 78L of the pressure-decreasing cylinder 78 is rapidly discharged through only the orifice C, resulting in a rapid decrease in the braking hydraulic pressure.

(3) On the other hand, when the main solenoid-operated valve 75 is set to an off-condition, the discharging of the oil made through the orifice C is stopped, and oil is rapidly introduced from the steering hydraulic pressure system PPS through an orifice A and the bypass passage 76b and the pressure in the left-chamber 78L of the pressure-decreasing cylinder 78 is increased. As a result, the pressure-decreasing piston 78d is rapidly pushed and the braking pressure is rapidly increased.

(4) In this condition, when the secondary solenoid-operated valve 76 is further set to an off-condition, the bypass passage 76b is closed and the introduction of oil from the steering hydraulic pressure system PPS is performed through the orifices A and B and the pressure in the left-chamber 78L is slowly increased, resulting in slow increase in the braking hydraulic pressure.

Figure 5:
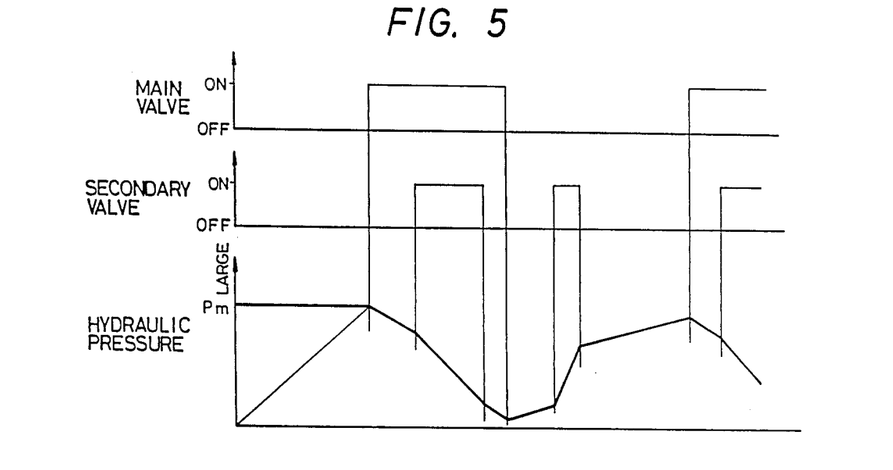
FIG. 5 is a timing chart useful for understanding the relationship between the conditions of solenoid-operated valves and hydraulic pressure.
Figure 6:
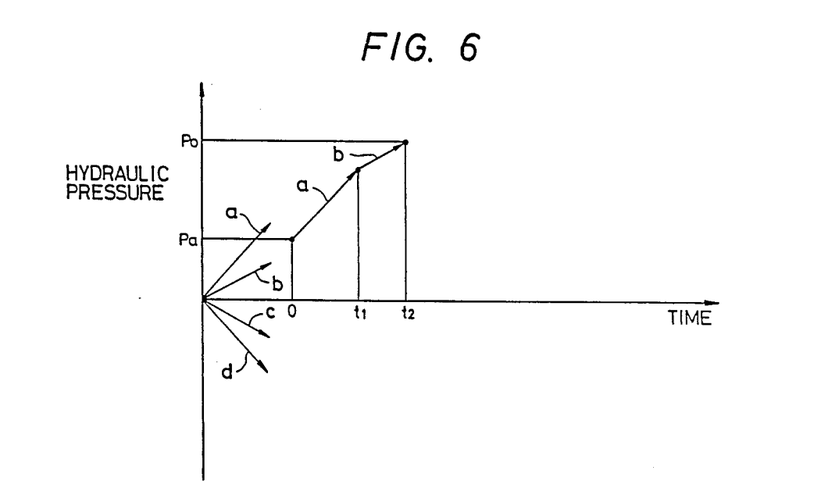
FIG. 6 is a graphic illustration for describing control patterns for hydraulic pressure.

In FIG. 5 is a timing chart useful for understanding the relationship between the conditions of these solenoid-operated valves 75 and 76 and the braking hydraulic pressure. As illustrated, the hydraulic pressure for the braking device 11, depending upon the hydraulic pressure Pm generated by the master cylinder 25, in accordance with the braking operation made by the vehicle driver, is increased or decreased in response to the conditions of the respective solenoid-operated valves 75 and 76. Therefore, as shown in FIG. 6, in order to obtain a required hydraulic pressure $P^*$, it is necessary to control the operating and closing time periods of the solenoid-operated valves 75 and 76. Assuming that the hydraulic pressure at the present time is Po and the required hydraulic pressure at the time t2 is $P^*$, in this hydraulic pressure system, it is required that the braking hydraulic pressure is controlled by sequentially selecting one from control patterns including rapid pressure-increasing a, slow pressure-increasing b, slow pressure-decreasing c, and rapid pressure-decreasing d. That is, the hydraulic pressure is rapidly increased between the time t0 and the time t1 and it is slowly increased between the time t1 and time t2.

Figure 7:
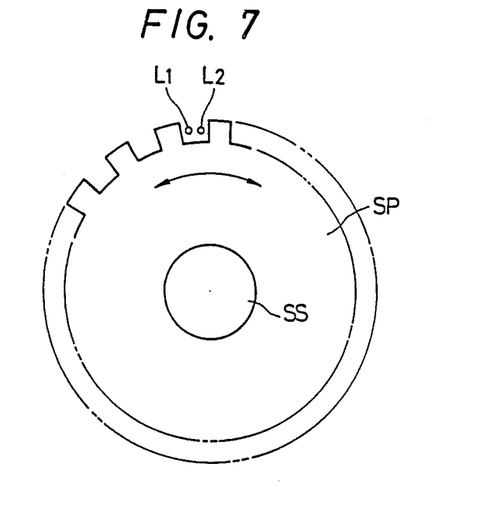
FIG. 7 is a diagram showing one example of arrangement of a steering amount sensor.
Figure 8A:
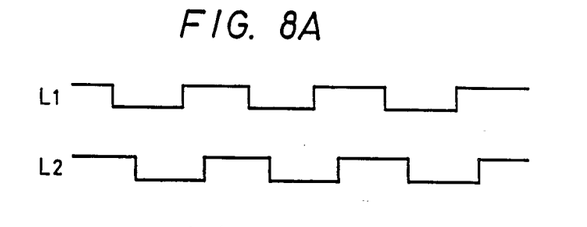
FIGS. 8A and 8B show output signals from the steering amount sensor.
Figure 8B:
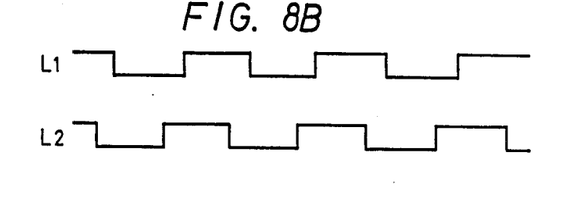

The steering amount sensor 55 corresponding to the steering amount detecting means M1 is of photoelectric transfer type, electromagnetic pick-up type, contact point type or the like, and is provided on the steering shaft to generate a pulse signal in accordance with the steering amount of the front wheels. FIG. 7 shows the relation between the photoelectric transfer type steering amount sensor 55 and the steering shaft SS operatively associated with the operation of the steering. The steering amount sensor 55 has two fixed sensors L1 and l2 secured with a predetermined phase difference and further has a rotating member SP rotated in accordance with the rotation of the steering shaft SS, and is arranged such that light emitted from a light source (not shown), which is provided opposite to the sensors L1, L2 to put the rotating member SP therebetween, is shut off or received by the sensors L1, L2, depending upon the rotation of the rotating member SP. Therefore, when the rotating member SP is rotated clockwise, the outputs of the sensor L1 and L2 have waveforms as shown in FIG. 8A. On the other hand, when the rotating member Sp is rotated counterclockwise, the outputs thereof have waveforms as shown in FIG. 8B. By reading the two-phase pulse signals by the pulse input port 71, as understood from both the output waveforms, the rotating direction of the steering shaft SS can be detected. The steering amount can be detected on the basis of the number of output pulses.

A summary in terms of the signal process and system control in the embodiment of the present invention will be described with reference to FIG. 9. The signal process is executed in accordance with the control program of a flow chart of FIG. 10 (which will be hereinafter described) using the hardware arrangement of FIG. 4. Therefore, FIG. 9 does not illustrate the arrangement of hardware, but conceptually shows a flow of the signal process.

In this embodiment, the ultimately controlled object is the wheel speed, i.e., rotational speed or rotational angular velocity $\omega$ of each of the wheel. The angular velocity $\omega$ is controlled to be equal to the target angular velocity $\omega^*$. Therefore, the physical quantities to be directly detected are the hydraulic pressure P of the braking devices 11 through 14 with respect to the wheels 1 through 4, the wheel speeds Nfr, Nfl, Nr detected by the wheel speed sensors 15, 16, 22, acceleration G of the vehicle detected by the acceleration sensor 54, and so on. The ECU derives a braking torque Tb with respect to the wheel by multiplying the hydraulic pressure P for the wheel by a coefficient K2 previously obtained in experimentation. On the other hand, using the friction coefficient, between the wheel and the road surface, it is possible to obtain a rotational torque Tf, which is provided by the road surface in the direction that the wheel should be rotated, on the basis of a coefficient K1 determined in advance. The coefficient K1 represents a value obtained on the basis of a load W applied to the wheel, the radius of rotation r of the wheel, and a constant. In this embodiment, the friction coefficient $\mu$ between the wheel and the road surface is not actually detected and this control system is arranged such that the control of slip ratio can be sufficiently performed irrespective of the variations of the friction coefficient, i.e., in the range of the values (for example, $0.7\pm0.4$) obtained in practice. However, it is appropriate to detect the friction coefficient by means of $\mu$ sensor, for example.

The angular velocity $\omega$ of the wheel 1 can be obtained using an actual torque Tr, i.e., the difference (Tf−Tb) between the braking torque Tb applied from the braking device 11 to the wheel 1 and the rotational torque Tf applied from the road surface to the wheel 1. Here, the angular velocity $\omega$ can be obtained by integrating (1/S) the actual torque Tr and multiplying a coefficient K3 wherein inertia I is taken in account.

On the other hand, the vehicle speed V can be calculated by integrating (1/S) one time the vehicle speed Vo obtained from the rotational angular speed Nfr of the wheel 1 immediately before the braking operation and the acceleration G then detected by the acceleration sensor 54 (in general equation, $V=Vo+Gt$, where t represents a time period elapsed from the start of the braking operation). This is indicated by K4/S in FIG. 9. Next, the turning radius of the front-right wheel 1 determined the steering angle detected by the steering amount sensor 55 is obtained by the operation indicated by K4/S in FIG. 9 in accordance with calculation or a table, and the vehicle speed Vfr of the front-right wheel portion is derived from the position relation on the vehicle with respect to the acceleration sensor 54.

Figure 11:
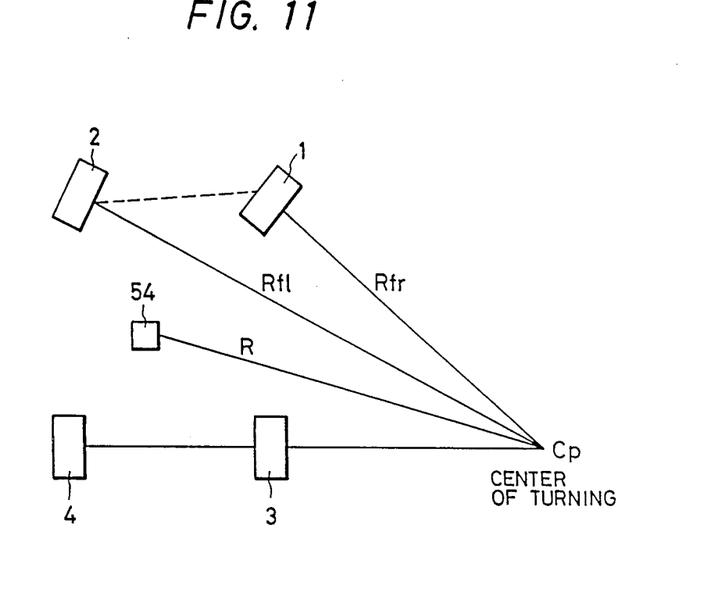
FIG. 11 is an illustration for describing the turning radii of wheels.

For example, as shown in FIG. 11, when the vehicle is turned clockwise, the vehicle speeds of the wheels 1, 2 are proportional to the turning radius Rfr, Rfl, and therefore, when the speed of the acceleration sensor portion is V, the vehicle speed Vfr of the front-right wheel portion is expressed by (Rfr/R)·V and the vehicle speed Vfl of the front-left wheel portion is expressed by (Rfl/R)·V. Of course, these are similar to the rear wheels 3, 4. However, it is not required that the rear-left wheel and rear-right wheel be independent, as compared with the front wheels. Particularly, in this embodiment, the speed difference therebetween is not taken into account.

Figure 9:
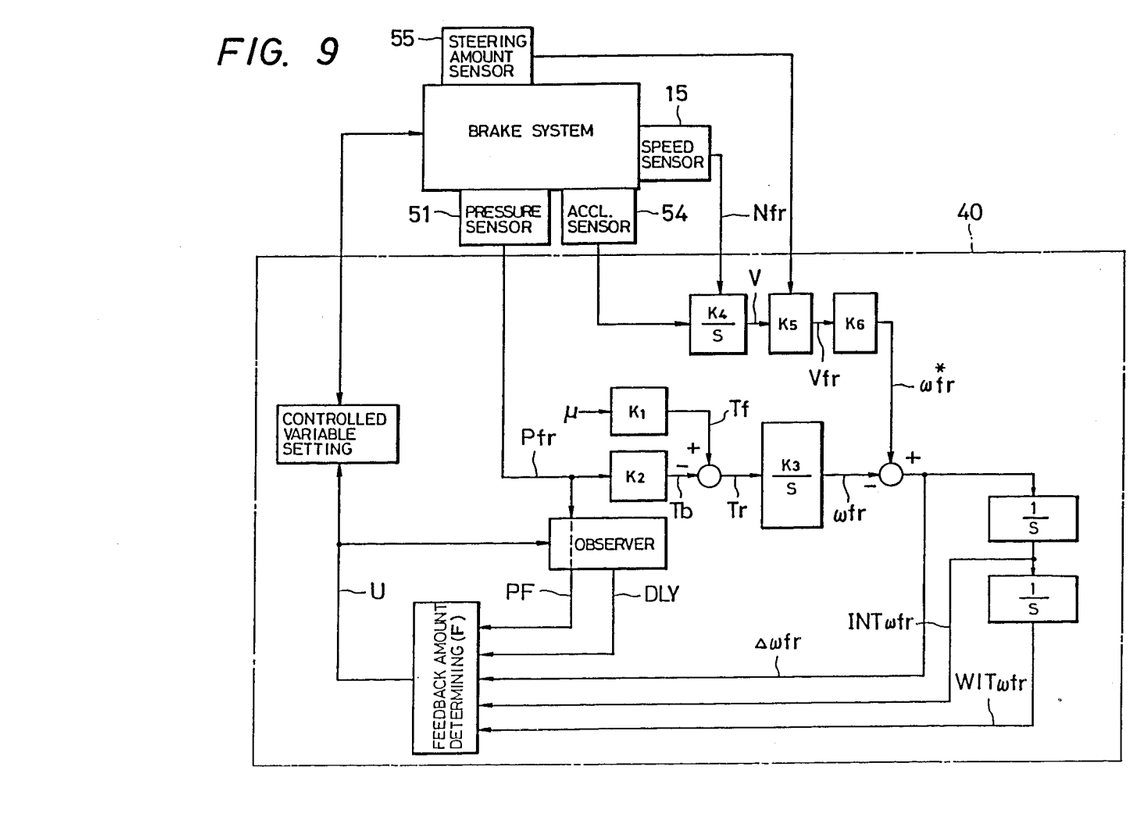
FIG. 9 is a signal flow chart useful for describing the signal process and the system control in the embodiment of the invention.

Using the vehicle speed Vfr thus obtained, the target angular velocity ω* of the front-right wheel 1 is obtained by the following equation in accordance with the process K6 in FIG. 9, i.e., taking into account the slip ratio SL, the radius r of turning of the wheel 1 and a constant K6'.

$$\omega fr^* = K6' \cdot Vfr \cdot (1-SL)/r$$

It is appropriate that the slip ratio SL is a fixed value and it is also acceptable to vary the same in accordance with the control.

The accumulated value INTufr of first order is obtained by integrating (1/S) the deviation Δωfr of the actual angular velocity ωfr of the wheel 1 from the target angular velocity ωfr*. The accumulated value INTωfr is integrated to obtain the accumulated value SWINωfr of second order for making a follow-yp in connection with the vehicle speed (angular velocity of the wheel) as a ramp function when the vehicle speed is decreased.

On the other hand, by constructing the observer, the variable DLY corresponding to dead time on control and hydraulic pressure PF, state variables are obtained on the basis of the hydraulic pressure PF, which is a control output, and the hydraulic pressure Pfr of the front-right wheel 1 actually detected. Since the element of the dead time treated in this embodiment can be represented as $e^{-LS}$ on the S plane, this can be treated as state variable DLY by Pade's approximation. In this embodiment, the Pade's approximation is regarded as second order approximation.

The control amount u for the hydraulic pressure of the hydraulic pressure system to be controlled is calculated by multiplying the deviation Δωfr of the angular velocity, the accumulated values INSωfr and WINωfr, the variable DLY, the hydraulic pressure Pfr obtained in the above-mentioned signal process by an optimal feedback gain F predetermined. Since the hydraulic pressure is actually controlled in accordance with the valve-opening and valve-closing operation of the main solenoid-operated valve 75 and the secondary solenoid-operated valve 76, the actual control amount of hydraulic pressure is obtained in a control amount setting section and is outputted to the system to be controlled.

According to the state equation (1) and the output equation (2), in this embodiment, the state variables X (k) of the expanded system, the control output u (k) to the controlled object, and the output y (k) of the controlled object are respectively treated as follows.

$$X(k) = \begin{bmatrix} DLY \\ Pfr \\ \Delta\omega fr \\ INT\omega fr \\ WIN\omega fr \end{bmatrix} \quad (3)$$

$$u(k) = \begin{bmatrix} u \\ \omega fr^* \end{bmatrix} \quad (4)$$

$$y(k) = \begin{bmatrix} \Delta\omega fr \\ DLY \\ INT\omega fr \\ WIN\omega fr \\ Pfr \end{bmatrix} \quad (5)$$

A description of control actually performed by the ECU 40 will now be made with reference to FIG. 10. In the description, a subscript "k" indicates that value is of the present time and a subscript "k+1" indicates that the value is of the next time which has been treated in the next process performed after the sampling time T.

Figure 10:
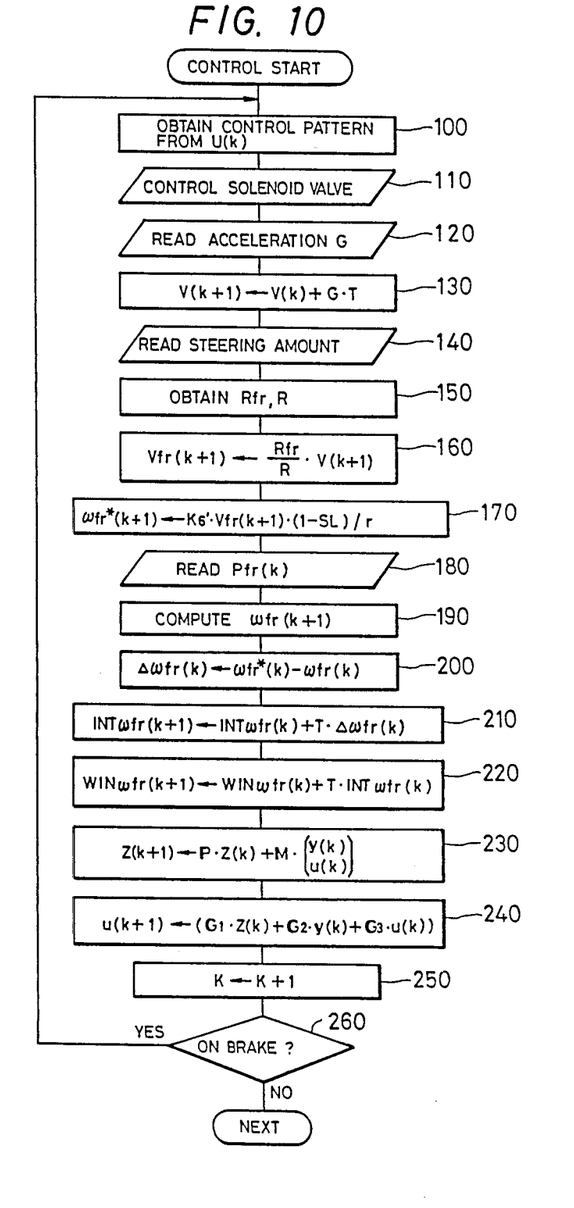
FIG. 10 is a flow chart showing a control program for brake control of the embodiment.

The CPU 61 starts the brake control process shown in FIG. 10 in response to the brake demand from the vehicle driver which is made by stepping into the brake pedal 24 when the vehicle is running, and repeatedly executes the process until the brake pedal 24 is released.

A step 100 is first executed to obtain a control pattern of hydraulic pressure on the basis of a control output u(k) obtained in a step 240 of the previous process. That is, as previously described using FIG. 6, the closing and opening time periods of the main solenoid-operated value 75 and the secondary solenoid-operated value 76 are determined to reach the hydraulic pressure u(k) during the sampling time T. In a subsequent step 110, the main solenoid-operated value 75 and secondary solenoid-operated value 76 are controlled in accordance with the control pattern obtained in the step 100.

Step 120 is executed to read the acceleration of the vehicle (assuming minus value in the case of decreasing the speed) obtained by the acceleration sensor 54, and is followed by a step 130 in which the next vehicle speed V(k+1) of the acceleration sensor portion is obtained in accordance with the following equation.

$$V(K+1) = V(k) + G\,T \quad (6)$$

where, T represents the time taken for processing this control routine by one time.

The initial value Vo of the vehicle speed V(k+1) can be obtained from the wheel speed Nfr of the front-right wheel 1 which has been rotated as non-driven wheel with the speed corresponding to the vehicle speed immediately before the braking operation. That is, the stps 120 and 130 functions as means M4 for detecting the vehicle speed.

A step 140 follows to read the steering amount detected by the steering amount sensor 55, and a step 150 is executed to obtain the turniing radius Rfr of the front-right wheel 1 and the turning radius R of the acceleration sensor 55 on the basis of the steering amount, i.e., the rotated direction and rotated angle of the steering shaft SS. The turning radiuses Rfr, R are obtained using a map in terms of the rotated angle and direction of the steering shaft SS and the already measured turning radii Rfr, R or a calculation equation.

In a step 160, the vehicle speed Vfr(k+1) of the front-right wheel portion is obtained in accordance with the following equation, using the turning radius Rfr of the front-right wheel 1, turning radius R of the acceleration sensor 54 and the obtained vehicle speed V(k+).

$$Vfr(k+1)=(Rfr/R)\cdot V(k+1)$$

In a step 170, the target angular speed ωfr*(k+1) of the front-right wheel 1 is calculated on the basis of the vehicle speed Vfr(k+1), that is, $$\omega fr^*(k+1)=K6'\cdot Vfr(k+1)\cdot(1-SL)/r \qquad (7)$$

A subsequent step 180 is executed to read the hydraulic pressure Pfr(k) of the hydraulic pressure system for the front-right wheel 1 detected by the hydraulic pressure sensor 51. A step 190 follows to obtain the rotational angular velocity ωfr(k+1). The angular velocity ωfr(k+1) is obtained using K1, K2, K3 and an integration based on the hydraulic pressure Pfr(k) as described with reference with FIG. 9. The steps 180 and 190 function as the rotational speed detecting means M3.

A subsequent step 200 is executed to obtain the deviation Δωfr(k) of the actual angular velocity ωfr(k) previously obtained in the Step 190 from the target angular velocity ωfr*(k) previously calculated in the step 170, followed by steps 210 and 220 in which the deviation Δωfr(k) is integrated. In the step 210, as first order integration, the following calculation is made.

$$\text{INT } fr(k+1)=\text{INT } fr(k)+T\cdot\Delta\omega fr(k)$$

While, in the step 220, the integration is further made, that is, $$\text{WIN } fr(k+1)=\text{WIN }(k)+T\text{ INT } fr(k)$$

Therefore, these integrations result in obtaining accumulated values INT fr(K+1) and WIN fr(i+1).

A subsequent step 230 is executed to compute the variable Z(k+1) in the observer using the parameters P, M predetermined. The observer is designed as a minimum order observer and estimates a variable DLY corresponding to the dead time in accordance with Pade's second order approximation. In the case of the internal variable is Z(k), the estimation of the state variable (k) is made as follows:

$$Z(k+1) = P\cdot Z(k) + M\cdot\begin{bmatrix} y(k) \\ u(k) \end{bmatrix} \qquad (8)$$

$$\hat{X}(k)=\overline{C}\cdot Z(k)+\overline{D}\cdot y(k) \qquad (9)$$

Here the parameters P, M, $\overline{C}$, $\overline{D}$ and so on can be obtained from a predetermined dynamic model (A, B, C) of the system to be controlled. The parameters are as follows:

$$P = [-1]$$

$$M = \begin{matrix} [0 & -1.19\times 10^5 & 0 \\ & 0 & 1.21\times 10^5 & 0] \end{matrix}$$

-continued $$\overline{C} = \begin{bmatrix} 1 \\ 0 \\ 0 \\ 0 \end{bmatrix}$$

$$\overline{D} = \begin{bmatrix} 0 & 1 & 0 & 0 & -1 \\ 0 & 1 & 0 & 0 & -1 \\ 1 & 0 & 0 & 0 & 0 \\ 0 & 0 & 1 & 0 & 0 \\ 0 & 0 & 0 & 1 & 0 \end{bmatrix}$$

Here, the state variables other than the hydraulic pressure PF and the variable DLY corresponding to the dead time are included in the outputs of the observer. However, these state variables are merely formal variables and in practice the respective variavles (Δωfr, INTωfr, WINωfr) obtained in the steps 200 through 220 are outputted as it is.

Control proceeds from the step 230 to a step 240 to obtain the control output u(k+1). The control output u(k+1) can be obtained as a function of the optimal feedpack gain F and the state variable X (k), that is, $$u(k+1) = -F\cdot X(k) \qquad (10)$$

however, it is difficult to directly use X (k) due to the dead time of the braking system. While, since X(k+1)=A·X(k)+B·u(k) according to the state equation (1), it is possible to approximate using A X (k)+B u(k) already obtained, instead of X (k+1). Therefore, the control output u(k+1) is given by $$u(k+1) = -\{F\cdot A\cdot X(k)+F\cdot B\cdot u(k)\} \qquad (11)$$

here, the state variable X (k) obtained from the equation (9) can be replaced with the estimated value $\hat{X}$ (k) of the observer. That is, $$u(k+1) = -\{F\cdot A\cdot \overline{C}\cdot Z(k) + F\cdot A\cdot \overline{D}\cdot y(k) + \qquad (12)$$
$$F\cdot B\cdot u(k)\}$$

in this case, the optimal feedback gain F has been given by:

$$F = -(R+B^T\cdot P\cdot B)^{-1}\cdot B^T\cdot P\cdot A \qquad (13)$$

Here, P is a solution of the following discrete Riccati equation;

$$P = A^T\cdot P\cdot A - A^T\cdot P\cdot B\cdot (B^T\cdot P\cdot B+R)^{-1}\cdot \qquad (14)$$
$$B^T\cdot P\cdot A + \begin{bmatrix} Q & 0 \\ 0 & 0 \end{bmatrix}$$

Furthermore, Q and R are the parameters used for simulation which make the following performance function J to a minimum and selected as optimal values.

$$J = \sum_{k=0}^{\infty}[y^T(k)\cdot Q\cdot y(k) + u^T(k)R\cdot u(k)] \qquad (15)$$

Therefore, F is predetermined and, the optimal feedback gain F according to this embodiment is as follows.

$$F = [2.81 \times 10]\ 1.00 \times 10^3\ 1.00 \times 10^2$$
$$1.18 \times 10^{-3}\ [-5.11 \times 10^{-2}]$$

Thus, it is possible to determine the parameters G 1, G 2, G 3 in advance as follows:

$$G1 = F \cdot A \cdot \widetilde{C} \quad (16)$$

$$G2 = F \cdot A \cdot \widetilde{D} \quad (17)$$

$$G3 = F \cdot B \quad (18)$$

The parameters P, M, $\widetilde{C}$, $\widetilde{D}$, G 1, G 2, G 3 are switched in accordance with the vehicle speed as described above. These parameters are in advance determined such that the speed of convergence of the system becomes slow as the vehicle speed is decreased.

In this embodiment, G 1 and G 3 are respectively vector of 1×1, i.e., scalar quantity.

In a step 240, using G 1, G 2, G 3, the hydraulic pressure u(k+1) is calculated as the control output in accordance with the following calculation.

$$u(k + 1) = -\{G1 \cdot Z(k) + G2 \cdot y(k) + G3 \cdot u(k)\} \quad (19)$$

A subsequent step 250 is executed to increment K indicating the number of sampling times by one.

Control proceeds to a step 260 wherein the condition of the brake sensor 56 read through the level input port 72 is checked and a decision is made if the vehicle is in braking operation. When the brake pedal is still operated, that is, it is in braking operation, the operational flow returns to the step 100 and the above-mentioned steps 100 to 260 are repeated. When the brake pedal has been released, this routine is terminated.

While the process of the FIG. 10 flow chart is for the purpose of the control of front-right wheel 1, the control for the front-left wheel 2 is expressed by a similar flow chart. Furthermore, the control for the rear wheels 3, 4 are identical to each other since only the actuator 33 is used and hydraulic pressures are equal to each other. In the control of the rear wheel 3, 4, of the steps of the flowchart of FIG. 10, the steps 140, 150 and 160 are omitted and the vehicle speed V(k) of the acceleration sensor 54 obtained in the step 130 is directly used for the control.

Accordingly to this embodiment thus arranged, since the dead time of the system controlling the braking hydraulic pressure of the braking device 11 is approximated or estimated by the observer, it is possible to control the angular velocity fr of the wheel 1 such that it is equal to the target angular velocity ωfr* without causing the excessive control due to the dead time. Furthermore, even during the turning of a vehicle, the brake control can be performed in accordance with the speed difference between the right and left wheels. In addition, the steering sensitivity becomes equal to that in the case of no braking operation. Therefore, it is possible to stop a vehicle to have the minimum braking distance in any cases as fine feeling is kept.

In this embodiment, even if the frictional coefficient is varied in a great range ($\mu=0.7\pm0.4$), it is possible to stably control the brake of the wheel 1, and therefore it is possible to stably control the slip ratio and maintain high braking characteristics of a vehicle irrespective of driving on roads on which the frictional coefficient is rapidly varied and the frictional coefficients of the right and left wheels are different from each other.

Furthermore, if the speed of convergence of control is decreased by varying the parameters of observer and so on as the vehicle speed decreases, stable control can be ensured upon low speed running.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention. For example, the rear wheels may be controlled in the same manner as the front wheels for the purpose of more stable brake control. Furthermore, it is appropriate to be arranged so that the target angular speed is varied in accordance with the operating degree of the braking pedal, so that the target angular speed is varied in stepwise fashion for an integration, or so that so called PID control is used for the brake control.

What is claimed is:

1. A system for controlling a brake of a vehicle having at least a front-right wheel and a front-left wheel, comprising:

first detector means for detecting a steering amount of said vehicle;

second detector means for detecting wheel speeds of said front-right and front-left wheels of said vehicle;

third detector means for detecting a vehicle speed of said vehicle;

braking pressure adjusting means for adjusting braking pressures transferred through a pressure transferring system to braking members for braking said wheels;

means for obtaining a turning radius of said front-right wheel and a turning radius of said front-left wheel on the basis of the steering amount detecting by said first detector means;

means for obtaining vehicle speeds of wheel portions of said front-right and front-left wheels on the basis of the obtained turning radii and the detected vehicle speed;

means for setting a target wheel speed of said front-right wheel and front-left wheel on the basis of the obtained wheel portion vehicle speed and predetermined slip ratio of said front-right wheel and front-left wheel; and control means for controlling said braking pressure adjusting means so that the wheel speed detected by said second detector means become equal to the set target wheel speeds.

2. A system for controlling a brake of a vehicle, comprising:

first detector means for detecting a steering amount of said vehicle;

second detector means for detecting a rotational angular velocity of a wheel of said vehicle;

third detector means for detecting a speed of said vehicle;

braking pressure adjusting means for adjusting a braking pressure of said wheel, the braking pressure being produced due to a braking operation of a vehicle driver;

a pressure transferring system for transforming said adjusted braking pressure to said brake for braking said wheel; and control means for controlling said braking pressure adjusting means, said control means including:

means for calculating a turning radius of said wheel on the basis of the steering amount detected by said first detector means, means for calculating a wheel portion vehicle speed on the basis of the obtained turning radius and the vehicle speed detected by said third detector means, means for setting a target rotational angular velocity of said wheel on the basis of the obtained wheel portion vehicle speed and a predetermined slip ratio of said wheel, a state observer for estimating state variables representing the internal state of said braking system, said state variables including a variable for dead time in the control of said braking pressure adjusting means, a deviation detecting means for detecting the deviation between said target rotational angular velocity and the detected rotational angular velocity of said wheel, a control value determining means for determining a control value on the basis of an optimal feedback gain predetermined and in accordance with said dynamic model, the estimated state variables, and the detected deviation, and means for outputting said determined control value to said braking pressure adjusting means so that the detected wheel rotational angular velocity becomes equal to said target rotational angular velocity.

3. A system as claimed in claim 2 wherein said state observer estimates the state variables on the basis of the control value determined by said control value determining means.

4. A system as claimed in claim 2 further including a braking pressure detecting means for detecting the braking pressure so that said state observer can estimated the state variables on the basis of the control value determined by said control value determining means and the braking pressure detected by said braking pressure detecting means.

5. A system as claimed in claim 2 wherein said control means further includes an accumulating means for integrating the deviation detected by said deviation detecting means, and said control value determining means being operable to determine the control value on the basis of the predetermined optimal feedback gain, the estimated state variables, the detected deviation, and the value integrated by said accumulating means.

6. A system as claimed in claim 5 wherein said accumulating means performs first and second order integration of the detected deviation and outputs the integrated values to said control value determining means.

7. A system as claimed in claim 6 further including braking pressure detecting means for detecting the braking pressure so that said state observer can estimate the state variables on the basis of the control value determined by said control value determining means and the braking pressure detected by said braking pressure detecting means.

* * * * *